United States Patent [19]
Kato

[11] 3,950,180

[45] Apr. 13, 1976

[54] COLORING COMPOSITES

[75] Inventor: Chuzo Kato, Tokyo, Japan

[73] Assignee: Mitsubishi Kinzoku Kabushiki Kaisha, Tokyo, Japan

[22] Filed: July 2, 1974

[21] Appl. No.: 485,086

[52] U.S. Cl.............................. 106/288 Q; 106/72
[51] Int. Cl.² ........................................ C09C 1/28
[58] Field of Search.............. 106/288 Q, 308 Q, 72

[56] References Cited
UNITED STATES PATENTS 3,778,457    12/1973    Mortland et al.............. 106/288 Q

*Primary Examiner*—Winston A. Douglas
*Assistant Examiner*—J. V. Howard
*Attorney, Agent, or Firm*—Edward J. Brenner

[57] ABSTRACT

Novel and inexpensive coloring composites comprising inorganic substances as main component combined with organic basic colored compounds are provided. The inorganic substances are composed of at least one clay mineral selected from the group consisting of zeolite and montmorillonite. The combination of the inorganic substances with the organic basic colored compounds is based on ionic bond, and the combined quantity of the organic basic colored compounds amounts to 0.01–50%. Therefore, the coloring composites have a remarkably improved and stabilized coloring power and are also improved in such properties as thermal resistance, light resistance, acid resistance and the like. In addition, the coloring composites may also change in color according to the value of pH.

5 Claims, No Drawings

COLORING COMPOSITES

BACKGROUND OF THE INVENTION

This invention relates to coloring composites which are manufactured by combining inorganic substances consisting of zeolite and/or montmorillonite with organic basic colored compounds through ionic bond.

In generall, clay minerals are used as fillers for extenders or lake pigments. Many of such clay minerals consist of mainly kaolinite, talc or pyrophyllite and are useful in making them inexpensive in cost. On the other hand, pigments manufactured by making organic dyestuffs adsorbed on said clay minerals are also used. In these pigments, however, the organic dyestuffs are adsorbed only on the surface of these clay minerals, the adsorbed quantity thereof being less than 1%. Namely, these clay minerals possess no cation between the crystal layers or in the three dimentional network structure thereof, consequently color development in these clay minerals is due to a mere physical adsorption of the dyestuffs on the surface thereof. The cation exchange capacity of these clay minerals is caused by silanol radicals existing at the ends or fractures of the crystals, and is only 5-10 meq per 100g. Therefore, these pigments have a weak coloring power and a thermal resistance lower than that of the dyestuffs adsorbed and consequently are limited in uses.

This invention has been devised to overcome these defects as described hereinabove.

BRIEF SUMMARY OF THE INVENTION

A primary object of the invention is to provide a novel coloring composite which has a remarkably improved and stabilized coloring power and is also improved in such properties as thermal resistance, light resistance, acid resistance and the like.

Another object of the invention is to provide a novel coloring composite which gives a very inexpensive pigment.

A further object of the invention is to provide a novel coloring composite which changes in color according to the value of pH.

According to this invention, there is provided a coloring composite comprising inorganic substances, said inorganic substances being at least one clay mineral selected from the group consisting of zeolite and montmorillonite, and organic base colored compounds combined with said inorganic substances through ionic bond.

The above and other features of the invention will be more fully appear from the following description.

DETAILED DESCRIPTION OF THE INVENTION

Inorganic substances used in this invention comprise at least one clay mineral selected the group consisting of zeolite and montmorillonite.

Zeolite comprises natural zeolite and synthetic zeolite. Of natural zeolite, mordenite group, analcite group, chabasite group, sodalite group, phillipsite group, natrolite group and also clinoptilolite may be used in this invention.

Zeolite, if necessary, may be alkali-treated to remove cristobalite, amorphous silicic acid and glassy substance and also may be acid-treated to make alkaline metal ions and alkaline earth metal ions exchanged by H ions for the purpose of facilitating the entering of organic cations.

Zeolite has a three dimensional network structure. According to this invention, when zeolite is made to react with organic basic colored compounds, the alkaline metal ions or H ions existing in the ion-exchange site of pores of the network structure of zeolite are exchanged with organic cations of the organic basic colored compounds, consequently zeolite becomes combined with the organic basic colored compounds through ionic bond. Zeolite has a cation exchange capacity of 60–400 meq per 100g.

As montmorillonite, hydrogenmontmorillonite prepared by alkali-treatment and successive acid-treatment of montmorillonite is used in this invention. Montmorillonite has a three layer type structure, which holds alkaline metal ions such as Na ion and the like or alkaline earth metal ions such as Ca ion and the like between the crystal layers and has ion-exchangeability. Montmorillonite also contains cristobalite, quartz, amorphous silicic acid and glassy substance as impurities.

Accordingly, montmorillonite is alkali-treated to remove these impurities, then neutralized with acid and successively acid-treated to remove alkaline metal ions and alkaline earth metal ions for preparing hydrogenmontmorillonite. Thus prepared hydrogenmontmorillonite contains neither more alkaline metal ion nor alkaline earth metal ion. Therefore, when hydrogenmontmorillonite is made to react with organic basic colored compounds having organic cations, the organic cations enter more easily into the crystal layers of hydrogenmontmorillonite to exchange H ions therein and then a coloring composite having a brighter color is obtained owing to the absence of iron oxides in hydrogenmontmorillonite. In this case, filleration also is more easily carried out.

When natural bentonite, a kind of montmorillonite, is used in the untreated state, it has a tendency to swell owing to its strong water absorbability and becomes a very viscous liquid which is difficult to be treated, while the use of hydrogenmontmorillonite dissolves this defect.

Hydrogenmontmorillonite has also a cation exchange capacity of 60-100 meq per 100g.

The conditions for the alkali-treatment of said inorganic substances are NaOH concentration of 0.5-2%, a temperature of 40°-80°C and a reaction time of ⅓-2 hrs, preferably NaOH concentration of 1% and a reaction time of 1 hr. The conditions for the acid-treatment of said inorganic substances are HCL or $H_2SO_4$ concentration of 0.5-2%, a temperature of 20°-50°C and a reaction time of ⅓-3 hrs, preferably HCL concentration of 1%, a temperature of 25°-35°C and a reaction time of 1 hr.

In this invention, a mixture of said zeolite and hydrogenmontmorillonite is also used as an inorganic substance.

Basic dyestuffs used in this invention comprise methine-, polymethine-, cyanine-, azo-, anthraquinone-, triphenylmethane-, azine-, thiazine-, phthalein dyes. Of these basic dyestuffs, C. I. Basic Red 12, 13, 27, 37, C. I. Basic Orange 21, 22, 27 and C. I. Basic Yellow 11, 21, 28, 29, 51 of methine-series, C. I. Basic Red 13 and C. I. Basic Yellow 13 of cyanine-series, C. I. Basic Yellow 34, 36 and C. I. Basic Red 18, 34, 38, 39 of azo-series, C. I. Basic Violet 25 and C. I. Basic Blue 21, 22, 60 of anthraquinone-series, C. I. Basic Blue 1, 5, 7, C. I. Basic Violet 1, 3, 14 and C. I. Basic Red 9 of triphenylmethane-series, and C. I. Basic Blue 3, 9, 24, 25 of thiazine-series are preferable.

When said alkali-treated and acid-treated inorganic substance is made to react with a water solution of the basic dyestuff, H ions existing between the crystal layers of said inorganic substance are exchanged with the organic cations of the basic dyestuff, thus there is obtained a coloring composite having a remarkably improved and stabilized coloring power.

The amount of the basic dyestuff is required to be under a cation-exchange capacity of the inorganic substance used. The excessive amount of the dyestuff makes a supernatant liquid colored and deteriorates such properties as bleeding, migration and acid resistance of the product. The amount of the basic dyestuff is 0.01–50 weight% of dried inorganic substances. The reaction temperature is 20°–50°C, preferably 30°–40°C.

The coloring composite described above is the one that does not change in color according to the value of pH of the suspension containing said composite. However, when such a basic coloring matter Crystal Violet, Methyl Orange and the like which change in color according to the value of pH is used as an organic basic colored compound, there can be manufactured a coloring composite which changes in color according to the value of pH. In this case, zeolite or hydrogenmontmorillonite is also used as an inorganic substance, but, similarly as in the above case, it is required to alkali-treat and successively acid-treat the inorganic substance prior to the reaction with the basic coloring matter.

When said inorganic substance, after these treatments, is made to react with a water solution of said basic coloring matter, H ions of said inorganic substance are exchanged with cations of the basic coloring matter, thus there is obtained a composite which changes in color according to the value of pH. In this case, the conditions for the cation exchange reaction are the same as those in the above case, but it is required to use a buffer solution having the value of pH specified by a basic coloring matter to be exchanged. Namely, it is required to select the value of pH varying from 3 to 10 according to the kind of a basic coloring matter and that of a color to be changed.

After reaction, the thus formed composite is filtered off, washed with water, dried at a temperature below 100°C and ground to a product. The amount of the basic coloring matter used for the reaction with zeolite or hydrogenmontmorillonite is 0.01–50 weight%, and the coloring strength of the composite is dependent upon said amount of the basic coloring matter. This dried composite, when brought in contact with water, acidic — or alkaline solution, changes in color according to the value of pH thereof. For example, when hydrogenmontmorillonite is made to react with Crystal Violet, H ions existing in the crystal layers of hydrogenmontmorillonite are exchanged with cations of Crystal Violet through ion-exchange. The formed composite is green in the dried state, but becomes purple when wetted with water and returns to green again when dried. Thus, the color change is reversible. This composite, however, becomes purple when wetted with a weak alkaline water solution of sodium bicarbonate instead of water, but does not return to green again even when dried. In this way, this composite may change in color reversibly or irreversibly. Papers coated with this composite can be used as a copying paper.

The thus manufactured composites have excellent properties as coloring pigments. For example, various kinds of brightly colored plastics can be obtained by kneading and pressing the mixture of raw plastics composites of 1–10 weight%.

The coloring composites of this invention have the following excellent properties, as compared with the conventional organic pigments.

1. Dispersibility is excellent.

The kneaded products of plastics and the composites of this invention are uniform in quality and contain neither spot not unkneaded part.

2. Heat resistance is remarkably improved.

The heat resistance of the conventional organic pigments is limited to about 180°C, but the composites of this invention can stand heat resistance test of 260°C (3 minutes). This is due to the fact that the chromophores which have entered into the crystal structure or between the crystal layers of said composites are kept in the protected state therein.

3. Light resistance is remarkably improved.

Plastics colored by the addition of the composites of this invention do not fade even when they are irradiated for 100 hrs with a weather-ometer using carbon arc. This is also due to the fact that said choromophores are protected by the clay crystal of said composites.

4. Migration is dissolved.

Plastic sheets colored by the addition of the composites of this invention do not show migration even when they are sticked on each other at 10kg/cm$^2$ and 80°C for 24 hrs.

5. Acid resistance is remarkably improved.

The composites of this invention do not fade even when they are treated with 5% HCL at ordinary temperature for an hour.

6. Manufacturing cost is lowered.

7. The range of use is increased.

The composites of this invention can be used also in coloring fillers for rubber, printing ink, crayon, color pencil and the like.

This invention will now be illustrated by the following examples. Of course, this invention shall not be limited to these examples.

EXAMPLE 1

100g of 100 mesh natural clinoptilolite having a cation exchange capacity of 180 meq per 100g as zeolite is added with 1l of water and stirred thoroughly. On standing for an hour, fine particles which do not settle and floating dusts are removed by decantation. Then, 0.5g of C. I. Basic Red 34 (azo dye) is dissolved in 1l of water. The water containing clinoptilolite is added slowly to the water solution of C. I. Basic Red 34 and then stirred at 25°C for about 30 minutes. After reaction, when the supernatant solution is confirmed to be colorless and clear, the reaction mixture is filtered off, washed with water thoroughly, dried at a temperature below 100°C and ground to a 300 mesh red pigment. This red pigment is excellent in such properties as light resistance, heat resistance, acid resistance, and has also good dispersibility in preparing colored plastics and paints.

EXAMPLE 2

100g of clinoptilolite from Itaya of Fukushima Prefecture as zeolite is added with 1l of a 1% solution of NaOH, stirred at 70°C for an hour, then filtered off and washed with water. The thus alkali-treated clinoptilolite is successively added with 1l of 2% HCL, stirred at 35°C for an hour, filtered off and washed with water. The thus alkali-treated and acid-treated clinoptilolite is added slowly to a 0.5% water solution of C. I. Basic Orange 21 (methine dye) and stirred at 35°C for 30 minutes. During the reaction, the value of pH is kept at 6.8–7.2 by the addition of $NH_3$ water. The reaction mixture is allowed to stand until the supernatant solution becomes colorless and clear, then it is washed several times by decantation, filtered off, dried at a temperature below 100°C and ground to a colored zeolite. This colored zeolite is excellent in heat resistance, light resistance, acid resistance, dispersibility, and proves to be remarkably suitable for a pigment.

EXAMPLE 3

100g of mordenite from Maji of Shimane Prefecture is alkali-treated and successively acid-treated in the same manner as in Example 2. The thus treated mordenite is added slowly to a 0.3% water solution of C. I. Basic Yellow (cyanine dye) and stirred at 30°C for an hour. During the reaction, the value of pH is kept at 6.8–7.2 by adding dropwise a water solution of sodium bicarbonate. When the supernatant solution becomes colorless and clear on standing, the reaction mixture is washed several times by decantation, filtered off, dried and ground to a colored zeolite. This colored zeolite has very excellent properties as a pigment.

EXAMPLE 4

100g of 100 mesh natural chabasite as zeolite is alkali-treated and successively acid-treated, washed with water thoroughly and filtered off in the same way as in Example 2. Then, 10g of C. I. Basic Blue 9 (thiazine dye) as a basic dyestuff is dissolved in 2l of water. The thus treated chabasite is added slowly to said water solution of C. I. Basic Blue 9 and stirred at 20°C for 2 hours. During the reaction, the value of pH is kept at 6.5–7.0 by the addition of a water solution of NaOH and a water solution of $H_2SO_4$. When the supernatant solution becomes clear on standing, the reaction mixture is filtered off, washed with water, dried at 100°C and ground to a 300 mesh red pigment. This pigment has excellent properties as a pigment.

EXAMPLE 5

100g of 100 mesh natural phillipsite as zeolite is treated in the same manner as Example 1. Then, 2g of C. I. Basic Blue 21 (anthraquinone dye) as a basic dyestuff is dissolved in 1l of water. The thus treated phillipsite is gradually added to said water solution of C. I. Basic Blue 21 and stirred at 30°C for an hour. During the reaction, the value of pH is kept at 6.5–7.0. After standing, the reaction mixture is filtered off, washed with water, dried at the temperature under 100°C and ground to a 300 mesh blue pigment.

EXAMPLE 6

100g of 100 mesh natural natorolite as zeolite is treated in the same way as in Example 2. Then, 5g of C. I. Basic Green 4 (triphenylmethane dye) is dissolved in 1l of water. The thus treated natorolite is added gradually to said water solution of C. I. Basic Green 4 and stirred at 40°C for 20 minutes. During the reaction, the value of pH is kept at 6.5–7.0. After standing, the reaction mixture is filtered off, washed with water, dried and ground to a green pigment.

EXAMPLE 7

100g of 100 mesh natural sodalite as zeolite is treated in the same manner as in Example 2. Then, the thus treated sodalite is added to a water solution consisting of 10l of water and 40g of C. I. Basic Red 2 (azine dye) as a basic dyestuff and stirred in the same manner as in Example 2. The reaction mixture is then filtered, washed with water, dried and ground to a red pigment.

EXAMPLE 8

100g of 100 mesh natural analcine as zeolite is added to a water solution consisting of 3l of water and 10g of C. I. Basic Green 6 (triarylmethane dye) as a basic dyestuff and treated in the same way as in Example 2, thus there is obtained a green pigment.

EXAMPLE 9

100 g of Molecular Sieve 5A powder as zeolite is added to a water solution consisting of 5l of water and 15g of C. I. Basic Red 1 (phthalein dye) and stirred. After standing, the reaction mixture is filtered off, washed with water, dried and ground, thus there is obtained a red pigment.

EXAMPLE 10

100g of Japanese acid clay from Itoigawa of Niigata Prefecture as a clay material is added with a 1% water solution of NaOH which is 10 times as much as the weight of said clay material and stirred at 70°C for an hour. Then, said clay material is filtered off, neutralized by the addition of HCL, and further added with 1% HCL which is 10 times as much as the weight of said clay material to remove alkaline metal ion, alkaline earth metal ion, iron oxide and inorganic salts. After acid-treatment, said clay material is washed by decantation and filtered off, thus there is obtained hydrogenmontmorillonite. Then, said hydrogenmontmorillonite is added gradually to a water solution consisting of 1l of water and 5g of C. I. Basic Blue 1 (triphenylmethane dye) and stirred at 30°C for an hour. When the supernatant solution becomes clear on standing, the reaction mixture is filtered off, washed with water, dried at a temperature below 100°C and ground to a blue pigment. This pigment proves to be a suitable additive for plastics and paints and also an excellent filler for rubber.

EXAMPLE 11

Hydrogenmontmorillonite is manufactured by alkali-treating and successively acid-treating Japanese acid clay from Itoigawa as a clay material in a similar manner as in Example 10. Then, a buffer solution is prepared by dissolving Crystal Violet as a basic coloring matter in water and regulating the value of pH thereof at 3. Then, said hydrogenmontmorillonite is made to react with Crystal Violet at 30°C for an hour in this buffer solution. The composition of the reaction mixture is as follows:

| | | |
|---|---|---|
| Japanese acid clay | 100g | |
| Crystal Violet | 0.75g | |
| 0.2M potassium hydrogenphthalate | 500ml | |
| 0.2N HCL | 200ml | pH about 3 |
| water | 1300ml | |

When the supernatant solution is confirmed to be colorless and clear on standing, the reaction mixture is filtered off, washed with water and dried, thus there is obtained a pigment which changes in color according to the value of pH. This product is pale green in the dried state, but becomes blue or purple when wetted with water and returns to pale green again when dried. This product, however, becomes purple when wetted with a 0.1% water solution of sodium bicarbonate and does not return to pale green even when dried.

Therefore, a product which is purple in the dried state, if necessary, can be manufactured by making hydrogenmontmorillonite react with Crystal Violet in a buffer solution which consists of 500ml of 0.2M $KH_2PO_4$, 470ml of 0.2N NaOH and 1l of water and has the value of pH regulated at about 8. The product becomes green when wetted with a 1% solution of acetic acid. The thus manufactured pigment is characterized by changing in color reversibly between green and purple according to the value of pH.

EXAMPLE 12

100g of clinoptilolite powder from Itaya of Fukushima Prefecture is used as zeolite, and Neutral Red is used as a basic coloring matter which changes in color according to the value of pH. Said clinoptilolite is made to react with Neutral Red at 35°C for 40 minutes in a buffer solution having the value of pH regulated at about 8. The composition of the reaction mixture is as follows:

| | | |
|---|---|---|
| clinoptilalite | 100g | |
| Neutral Red | 3g | |
| 0.2M $KH_2PO_4$ | 500ml | |
| 0.2N NaOH | 470ml | pH about 8 |
| water | 1000ml | |

When the supernatant solution becomes colorless and clear on standing, the reaction mixture is filtered off, washed with water, and dried, thus there is obtained a pigment which changes in color according to the value of pH.

This product is yellow in the dried state, but becomes red when wetted with a 1% solution of acetic acid.

Then thus manufactured pigment is characterized by changing in color reversibly between red and yellow at the value of pH 6.8–8.0.

What is claimed is:

1. A coloring composite comprising an inorganic substance, said inorganic substance being at least one clay mineral selected from the group consisting of zeolites and hydrogenmontmorillonite, said hydrogenmontmorillonite being prepared by alkali-treatment and successive acid-treatment of montmorillonite, and a compound selected from the group consisting of organic basic colored compounds having organic cations, said organic basic colored compounds being composed of methine-, polymethine-, cyanine-, azo-, anthraquinone-, triphenylmethane-, thiazine-, azine-, triarylmethane-, phthalein basic dyes and being combined with said inorganic substance through ionic bond.

2. A coloring composite as described in claim 1, wherein said zeolites comprise natural zeolite, synthetic zeolite and an alkali-treated and successively acid-treated one thereof.

3. A coloring composite as described in claim 1, wherein said organic basic colored compounds are composed of methine- and polymethine dyes having methine bond, cyanine dye having a heterocycle formed by one nitrogen atom and at least two carbon atoms, anthraquinone dye having more than two anthraquinone nucleuses, thiazine dye having thiazine ring, triphenylmethane dye having triphenylmethane radical, azine dye having phenoxazonium radical or phenothioazonium radical, triarylmethane dye having triarylmethane radical, phthalein- and sulfophthalein-derivative dye.

4. A coloring composite as described in claim 1, wherein said organic basic colored compounds comprise basic coloring matters changing in color according to the value of pH.

5. A coloring composite as described in claim 1, wherein the amount of said organic basic colored compounds is 0.01–50 weight percent of said inorganic substance in dried state.

* * * * *